(12) United States Patent
Fang

(10) Patent No.: US 11,301,084 B2
(45) Date of Patent: *Apr. 12, 2022

(54) METHOD OF DETECTING TOUCH POINT AND TOUCH CONTROLLER

(71) Applicant: SHENZHEN GOODIX TECHNOLOGY CO., LTD., Guangdong (CN)

(72) Inventor: Jun Fang, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/213,556

(22) Filed: Mar. 26, 2021

(65) Prior Publication Data
US 2021/0216205 A1 Jul. 15, 2021

Related U.S. Application Data

(63) Continuation of application No. 16/107,139, filed on Aug. 21, 2018, now Pat. No. 11,036,334, which is a
(Continued)

(51) Int. Cl.
G06F 3/044 (2006.01)
G06F 3/041 (2006.01)

(52) U.S. Cl.
CPC ...... *G06F 3/041662* (2019.05); *G06F 3/0446* (2019.05); *G06F 2203/04104* (2013.01)

(58) Field of Classification Search
CPC ............ G06F 3/804166; G06F 3/0446; G06F 2203/04104; G06F 3/044
See application file for complete search history.

(56) References Cited

U.S. PATENT DOCUMENTS 8,970,527 B2 3/2015 Huang et al.
9,389,738 B2 7/2016 Chang et al.
(Continued)

FOREIGN PATENT DOCUMENTS

CN 101211241 A 7/2008
CN 101903851 A 12/2010
(Continued)

OTHER PUBLICATIONS

Qiwen, Z. et al., "Study on different touch object recognition algorithm based on Android and capacitive touch panel", 10th International Conference on Sensing Technology (ICST), Dec. 26, 2016, pp. 1-5.
(Continued)

*Primary Examiner* — Sanghyuk Park
(74) *Attorney, Agent, or Firm* — Scully Scott Murphy & Presser

(57) ABSTRACT

A method of detecting a touch point and a touch controller is disclosed. The method includes: a touch detection mode is determined according to a first result at an initial time of a detection period (S110), the first result being a touch detection result corresponding to an adjacent detection period prior to the detection period; and a touch point on a touch screen is detected in the touch detection mode (S120), where the touch detection mode includes a single-finger touch detection mode and a multi-finger touch detection mode. A method of detecting a touch point could achieve a balance between power consumption and response speed, and accordingly, improve user experience.

20 Claims, 6 Drawing Sheets

Related U.S. Application Data continuation of application No. PCT/CN2017/093641, filed on Jul. 20, 2017.

(56) References Cited

U.S. PATENT DOCUMENTS

| | | |
|---|---|---|
| 9,798,428 B2 | 10/2017 | Dai et al. |
| 2009/0251434 A1* | 10/2009 | Rimon ................. G06F 3/0445 345/173 |
| 2011/0148786 A1 | 6/2011 | Day et al. |
| 2013/0127757 A1* | 5/2013 | Mann .................... G06F 1/3262 345/173 |
| 2013/0127758 A1 | 5/2013 | Kim et al. |
| 2013/0155007 A1 | 6/2013 | Huang et al. |
| 2014/0267146 A1 | 9/2014 | Chang et al. |
| 2014/0285469 A1 | 9/2014 | Wright et al. |
| 2014/0368460 A1 | 12/2014 | Mo et al. |
| 2015/0029134 A1 | 1/2015 | Liu et al. |
| 2015/0049044 A1 | 2/2015 | Yousefpor et al. |
| 2015/0077394 A1 | 3/2015 | Dai et al. |
| 2015/0346864 A1 | 12/2015 | Yang et al. |
| 2015/0355774 A1* | 12/2015 | Johansson ............... G09G 3/20 345/173 |
| 2016/0162059 A1 | 6/2016 | Teng et al. |
| 2016/0195990 A1 | 7/2016 | Han et al. |
| 2017/0090658 A1 | 3/2017 | Park et al. |
| 2017/0153736 A1* | 6/2017 | Kim ...................... G06F 3/0443 |
| 2017/0242507 A1* | 8/2017 | Chang .................... G06F 3/044 |
| 2017/0371455 A1 | 12/2017 | Dai et al. |

FOREIGN PATENT DOCUMENTS

| | | |
|---|---|---|
| CN | 102214026 A | 10/2011 |
| CN | 102576278 A | 7/2012 |
| CN | 102830882 A | 12/2012 |
| CN | 102968235 A | 3/2013 |
| CN | 103294323 A | 9/2013 |
| CN | 103902113 A | 7/2014 |
| CN | 104345998 A | 2/2015 |
| CN | 104375733 A | 2/2015 |
| CN | 105474154 A | 4/2016 |
| CN | 106155382 A | 11/2016 |
| CN | 106919289 A | 7/2017 |
| TW | 201327330 A1 | 7/2013 |
| TW | 201435694 A | 9/2014 |
| WO | 2013/155098 A1 | 10/2013 |

OTHER PUBLICATIONS

Zhang, J. et al., "A self-cap and mutual-cap detection circuit for capacitive touch panel", Journal of Beijing Jiaotong University, Apr. 15, 2016, pp. 36-40, vol. 40, No. 2 together with an English language abstract.

* cited by examiner

METHOD OF DETECTING TOUCH POINT AND TOUCH CONTROLLER

CROSS-REFERENCE TO RELATED APPLICATIONS

This application is a continuation of U.S. patent application Ser. No. 16/107,139, filed on Aug. 21, 2018, which is a continuation of International Application No. PCT/CN2017/093641, filed on Jul. 20, 2017. All of the afore-mentioned patent applications are hereby incorporated by reference in their entireties.

TECHNICAL FIELD

Embodiments of the present disclosure relate to the field of touch screens, and more particularly, to a method of detecting a touch point and a touch controller.

BACKGROUND

As a capacitive touch screen develops, more and more electronic devices use the capacitive touch screen as an input interaction device due to its simple operation, generality as well as good experience.

Currently, the most widely applied capacitive touch screen in the market mainly uses a mutual-capacitance detection technique. Advantages of the mutual-capacitance detection technique are: realization of detection of multiple touch points, and relatively higher detection precision, whereas disadvantage thereof is: longer time consumption.

In addition, a common capacitive chip may also adopt a self-capacitance detection technique. Advantages of the self-capacitance detection technique are: shorter detection time, whereas disadvantage thereof is: only a single touch point or no touch point can be detected, while a multi-finger touch cannot be detected accurately.

However, for touch screen products, power consumption and response speed are two important factors. The power consumption has a direct impact on endurance capability of a device such as a mobile phone, while the response speed has a direct impact on fluency of a user operation, and a combination of the two has a direct impact on user experience. Generally speaking, the higher the response speed is, the higher the power consumption of a device is.

Therefore, it is of significant importance to find a solution to achieve a balance between response speed and power consumption.

SUMMARY

A method of detecting a touch point and a touch controller is provided, which could achieve a balance between response speed and power consumption, and accordingly, improve user experience.

In a first aspect, A method of detecting a touch point is provided, where the method includes:

determining a touch detection mode according to a first result at an initial time of a detection period, the first result being a touch detection result corresponding to an adjacent detection period prior to the detection period; and detecting a touch point on a touch screen in the touch detection mode, where the touch detection mode includes a single-finger touch detection mode and a multi-finger touch detection mode.

The method of detecting a touch point in the embodiment of the present disclosure, determining a touch detection mode corresponding to an initial time of a current detection period by a detection result corresponding to a previous detection period, could achieve a balance between response speed and power consumption effectively.

In some possible implementations, the single-finger touch detection mode refers to: determining a touch point on the touch screen by detection data in one direction or by combining detection data in multiple directions; and the multi-finger touch detection mode refers to: determining a touch point on the touch screen by detection data on a plane, where the detection data in each of the multiple directions comprises at least one detection data for representing a touch condition in a single direction, and the detection data on the plane comprises at least one detection data for representing a touch condition of planar coordinates.

In some possible implementations, if the first result is that there is no touch point or one touch point, the determining the touch detection mode according to the first result includes:

determining the touch detection mode as a single-finger touch detection mode.

The method of detecting a touch point in the embodiment of the present disclosure, dynamically selecting a touch detection mode at an initial time of a current detection period by combining a touch detection result corresponding to a previous detection period, thereby detecting a touch point on a touch screen, could achieve a balance between power consumption and response speed effectively and accordingly improve user experience. In particular, in the case where there is only one touch point or no touch point on a touch screen, the method saves the proportion of detection time effectively and achieves an aim of reducing power consumption, while producing no impact on response speed of a user operation.

In one possible implementation, the method further includes:

if only one touch point or no touch point is detected on the touch screen in the single-finger touch detection mode, using a touch detection result corresponding to the single-finger touch detection mode as a touch detection result corresponding to the detection period.

In some possible implementations, the method further includes:

if the first result is that there is no touch point, and only one touch point is detected on the touch screen in the single-finger touch detection mode, re-detecting a touch point on the touch screen in the single-finger touch detection mode; and using a re-detected touch detection result as a touch detection result corresponding to the detection period.

The method of detecting a touch point in the embodiment of the present disclosure, in a scenario where there is no touch point, for example, the touch screen is left unused or plays a video, could effectively save detection duration of a touch point and accordingly reduce power consumption. Moreover, response to a user touch does not become slower either.

In some possible implementations, the method further includes:

if multiple touch points are detected on the touch screen in the single-finger touch detection mode, detecting a touch point on the touch screen in the multi-finger touch detection mode; and using a touch detection result corresponding to the multi-finger touch detection mode as a touch detection result corresponding to the detection period.

In some possible implementations, if the first result is that there are multiple touch points, the determining the touch detection mode according to the first result includes:

determining the touch detection mode as a multi-finger touch detection mode.

In some possible implementations, the touch screen is configured with at least one first channel in a first direction and at least one second channel in a second direction, the first direction and the second direction being perpendicular, and an intersection of the at least one first channel and the at least one second channel being a capacitance node, where the single-finger touch detection mode refers to: determining a touch point on the touch screen by detection data of the capacitance node in the first direction and/or the second direction; and the multi-finger touch detection mode refers to: determining a touch point on the touch screen by detection data of the capacitance node on a plane formed by the first direction and the second direction.

In some possible implementations, the single-finger touch detection mode includes a high speed mutual-capacitance detection mode, and the high speed mutual-capacitance detection mode refers to:

acquiring detection data of the at least one first channel in the first direction by transmitting a drive signal simultaneously along the at least one second channel; and acquiring detection data of the at least one second channel in the second direction by transmitting a drive signal simultaneously along the at least one first channel.

A signal-to-noise ratio of the high speed mutual-capacitance detection mode according to the embodiment of the present disclosure is greater than that of a self-capacitance detection mode.

In some possible implementations, the single-finger touch detection mode includes a self-capacitance detection mode, and the multi-finger touch detection mode includes a mutual-capacitance detection mode.

In some possible implementations, the detection period is configured by a user.

In a second aspect, a touch controller is provided, where the touch controller includes:

a determination unit, configured to determine a touch detection mode according to a first result at an initial time of a detection period, the first result being a touch detection result corresponding to an adjacent detection period prior to the detection period; and a detection unit, configured to detect a touch point on a touch screen in the touch detection mode, where the touch detection mode includes a single-finger touch detection mode and a multi-finger touch detection mode.

In a third aspect, a touch controller is provided, where the touch controller includes a processor, configured to:

determine a touch detection mode according to a first result at an initial time of a detection period, the first result being a touch detection result corresponding to an adjacent detection period prior to the detection period; and detect a touch point on a touch screen in the touch detection mode, where the touch detection mode includes a single-finger touch detection mode and a multi-finger touch detection mode.

In a fourth aspect, a chip or an electronic device is provided, including the touch controller according to the second aspect or the third aspect.

In a fifth aspect, a chip or an electronic device is provided, including:

the touch controller according to the second aspect or the third aspect, and a touch sensor connected to the touch controller, where the touch controller detects a touch point on a touch screen by controlling the sensor.

In a sixth aspect, a computer readable storage medium storing a program is provided, which causes a touch controller to perform the method in the above first aspect or any possible implementation in the first aspect.

In a seventh aspect, provided is a computer program product including instructions is provided, which cause a computer to perform the method in the above first aspect or any possible implementation in the first aspect when executed on the computer.

DESCRIPTION OF EMBODIMENTS

Technical solutions in embodiments of the present disclosure will be described below with reference to the accompanying drawings.

It should be understood that embodiments of the present disclosure are applicable to any apparatus and device configured with a capacitive touch screen, for example, a smart mobile phone and a small personal portable device such as a personal digital assistant (PDA), an electronic book (E-book) and the like; for another example, household appliances such as a refrigerator, a liquid crystal display television, a washing machine, a coffee pot, a microwave oven, etc.; for another example, a public consultation system device such as an automatic teller machine (ATM), a KIOSK, a ticket vending machine, a digital photo printing system, etc.; and for another example, a communication device: a video phone, a network television, a set top box (STB), a global positioning system (GPS) device, etc.

In terms of a touch screen, during a detection period, the less the time occupied by touch detection is, the greater time proportion of a touch screen entering a low power consumption mode is, and the lower power consumption of the touch screen is. For example, assuming that a refresh rate is required to be 100 Hz (i.e., a detection period is 10 ms), if sampling and related calculation have been completed within 7 ms of the 10 ms, a low power consumption mode can be entered in the remaining 3 ms. The proportion of working time is 70%.

Generally, a touch screen is configured with two detection modes: a self-capacitance detection mode and a mutual-capacitance detection mode. Although the self-capacitance detection mode can reduce power consumption and improve response speed, detection precision is lower and only single point detection can be realized. Although the mutual-capacitance detection mode has higher detection precision and can achieve real multi-point detection, it takes a longer time during the detection, and response speed is slower. If the same detection mode is adopted all through detection of a touch point on a touch screen, it is difficult to achieve a balance between response speed and power consumption of the touch screen simultaneously.

Embodiments of the present disclosure provide a method of detecting a touch point, where a touch detection mode corresponding to an initial time of a current detection period is determined by a detection result corresponding to a previous detection period, thereby achieving a balance between response speed and power consumption effectively.

Figure 1:
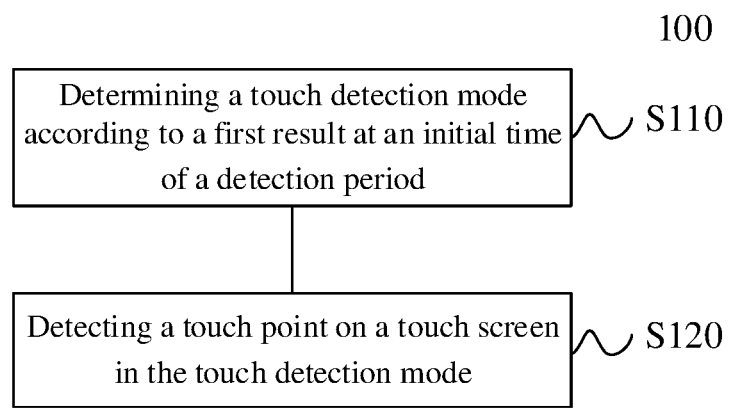
FIG. 1 is a first schematic flowchart of a method of detecting a touch point according to an embodiment of the present disclosure.

FIG. 1 is a schematic flowchart of a method 100 of detecting a touch point according to an embodiment of the present disclosure. The method of detecting the touch point may be performed by a touch controller or a processor of a device, which is not specifically limited in the embodiment of the present disclosure.

As shown in FIG. 1, the method 100 includes:

S110, determining a touch detection mode according to a first result at an initial time of a detection period; and S120, detecting a touch point on a touch screen in the touch detection mode.

Specifically, a touch detection mode is determined according to a first result at an initial time of a detection period, the first result being a touch detection result corresponding to an adjacent detection period prior to the detection period; and touch detection is performed on a touch screen in the touch detection mode, where the touch detection mode includes a single-finger touch detection mode and a multi-finger touch detection mode.

For example, a touch detection result in the embodiment of the present disclosure may be coordinates of a touch point on a touch screen. That is, when a touch detection mode is determined based on the first result, a touch detection mode may be determined according to the number of coordinates of the touch point. In addition, it may also be determined by envelope change of data, for example, in a self-capacitance detection mode, if two touch envelopes exist in a certain direction, it is highly likely that it is a multi-finger press.

Optionally, the single-finger touch detection mode refers to: determining a touch point on the touch screen by detection data in one direction or by combining detection data in multiple directions; and the multi-finger touch detection mode refers to: determining a touch point on the touch screen by detection data on a plane, where the detection data in each of the multiple directions includes at least one detection data for representing a touch condition in a single direction, and the detection data on the plane includes at least one detection data for representing a touch condition of planar coordinates. It can be seen from detection characteristics that the self-capacitance detection mode belongs to a single-finger touch detection mode, whereas the mutual-capacitance detection mode belongs to a multi-finger touch detection mode.

It should be understood that in the embodiment of the present disclosure, the touch detection mode determined in the above step S110 may be a touch detection mode in the detection period, or may be a touch detection mode in a phase of the detection period. In other words, in the above step S120, when a touch point on the touch screen is detected in the touch detection mode, a touch detection result will be generated, where the touch detection result may be a touch detection result corresponding to the detection period, or may be a touch detection result in a phase of the detection period, which is not specifically limited in the embodiment of the present disclosure. That is, the embodiment of the present disclosure does not specifically limit whether the touch detection result generated in the above step S120 is a touch detection result corresponding to the detection period.

For the convenience of understanding of a technical solution in an embodiment of the present disclosure, specific description is made below to technical terms of a single-finger touch detection mode and a multi-finger touch detection mode in the embodiment of the present disclosure with reference to FIG. 2. It should be understood that related explanations of terms below are exemplary, which shall not limit the embodiment of the present disclosure.

Figure 2:
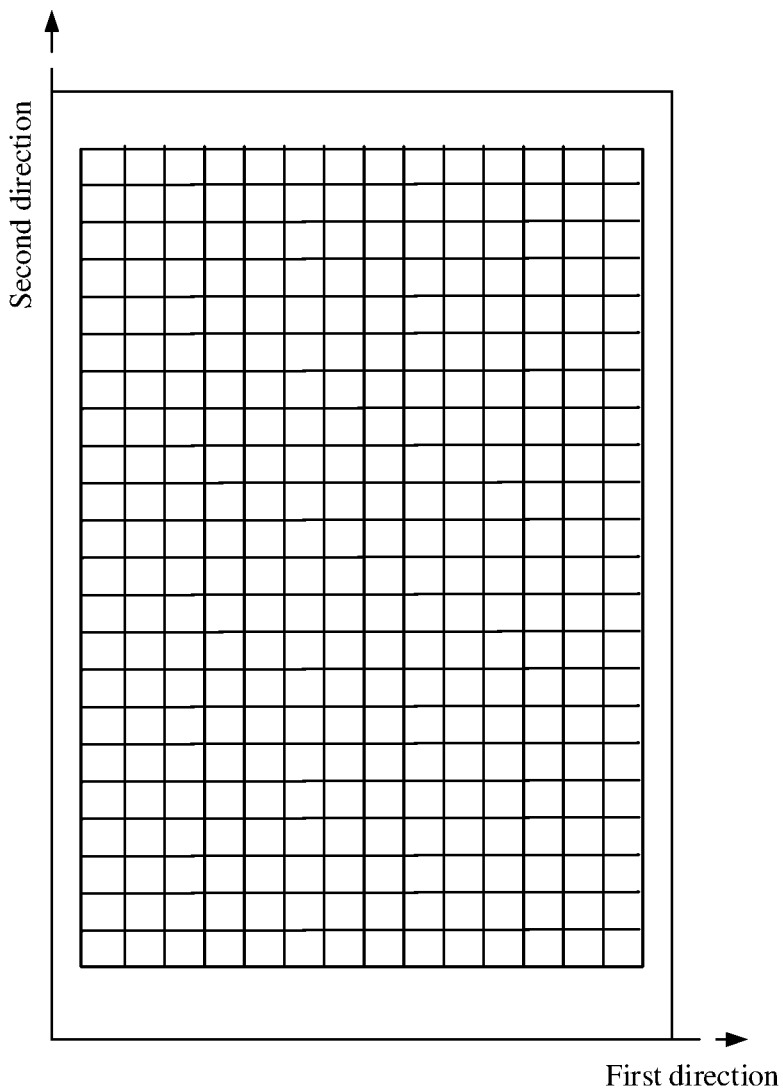
FIG. 2 is an example of a detection channel of a touch screen according to an embodiment of the present disclosure.

FIG. 2 is an example of a detection channel of a touch screen according to an embodiment of the present disclosure. It should be understood that a detection channel of a touch screen according to an embodiment of the present disclosure is not limited to this.

As shown in FIG. 2, a touch screen is divided into a first direction and a second direction, and the touch screen is configured with at least one first channel in the first direction and at least one second channel in the second direction, the first direction and the second direction being perpendicular, and an intersection of the at least one first channel and the at least one second channel being a capacitance node. It should be understood that dashed portions in FIG. 2 are mere schematic illustration of specific directions of the first direction and the second direction, where each line in a solid-line frame represents a channel, and each intersection represents a capacitance node.

It can be found that if there is only one touch point on a touch screen, only data in the first direction and the second direction as shown in FIG. 2 are needed to determine coordinates of the touch point on the touch screen. For example, suppose that the lower left corner of the touch screen is regarded as the coordinates of origin, the first direction is X direction and the second direction is Y direction. If it is determined that a touch occurs at a position where X=1 by the data in the X direction and a touch occurs at a position where Y=3 by the data in the Y direction, the possible touch position can be determined as (1, 3) by combining the data in the X direction and the Y direction.

That is, if one touch point is detected, it does not need data on the whole plane (detection is performed for each capacitance node). In the embodiment of the present disclosure, a detection mode of determining the touch point by detection data in one direction or multiple directions is defined as a single-finger touch detection mode. The characteristics of the single-finger touch detection mode are: less time consumption and lower detection precision. Thus the single-finger touch detection mode is applied to a scenario where there is only one touch point or no touch point on a touch screen.

For example, the single-finger touch detection mode may refer to: determining a touch point on the touch screen by detection data of the capacitance node in the first direction and/or the second direction.

The following schematically illustrates the single-finger touch detection mode by taking a self-capacitance detection mode as an example.

In the self-capacitance detection mode according to the embodiment of the present disclosure, a channel of a drive signal and a channel of a detection signal are the same channel. Specifically, as shown in FIG. 2, suppose that detection is performed on the first direction and the second direction respectively, it takes 2*T1 in total.

Similarly, it can be found that if there are multiple touch points on a touch screen, only data in the first direction and the second direction as shown in FIG. 2 are not sufficient to determine the number of touch points and coordinates of the touch points on the touch screen accurately. For example, suppose that the lower left corner of the touch screen is regarded as the coordinates of origin of the touch screen, the first direction is X direction and the second direction is Y direction. If it is determined that a touch occurs at a position where X=1 and X=2 by the data in the X direction and a touch occurs at positions where Y=3 and Y=4 by the data in the Y direction, the possible touch position can only be determined as (1, 3), (1, 4), (2, 3) and (2, 4) by combining the data in the X direction and the Y direction, while the specific touch point on the touch screen cannot be determined, thereby generating "ghosting".

Therefore, in order to know whether each capacitance node is touched or not accurately, it needs to detect each capacitance node separately. That is, data on the whole plane are needed to be acquired. In the embodiment of the present disclosure, a detection mode of determining the touch point by detection data on a plane is defined as multi-finger touch detection. The characteristics of the multi-finger touch detection mode are: higher detection precision and longer time consumption. Thus the multi-finger touch detection mode is applied to a scenario where there are multiple touch points on a touch screen.

For example, the multi-finger touch detection mode may refer to: determining a touch point on the touch screen by detection data of the capacitance node on a plane formed by the first direction and the second direction.

The following schematically illustrates the multi-finger touch detection mode by taking a mutual-capacitance detection mode as an example.

In the mutual-capacitance detection mode according to the embodiment of the present disclosure, a channel of a drive signal and a channel of a detection signal are different channels. Specifically, as shown in FIG. 2, suppose that the first direction is a signal driving direction and the second direction is a signal receiving direction, a receiving module can receive signals along at least one second channel in the second direction simultaneously, and it takes T1 for each sampling. If all nodes are detected, it needs to perform one sampling on each first channel of the above at least one first channel, it takes M*T1 in total, where M is the number of the above at least one first channel.

It needs to be noted that although the multi-finger touch detection mode is applied to a scenario where there are multiple touch points on a touch screen, the multi-finger touch detection mode can also be applied to a scenario where there is only one touch point or no touch point on a touch screen.

In the embodiment of the present disclosure, after making amendments to the mutual-capacitance detection mode, it further proposes a touch detection mode (i.e., a high speed mutual-capacitance detection mode) that conforms to the characteristics of the single-finger touch detection mode. Specifically, the high speed mutual-capacitance detection mode may refer to: acquiring detection data of the at least one first channel in the first direction by transmitting drive signals simultaneously along the at least one second channel; and acquiring detection data of the at least one second channel in the second direction by transmitting drive signals simultaneously along the at least one first channel.

More specifically, as shown in FIG. 2, When data in the second direction is detected, the first direction is a signal driving direction, and the second direction is a signal receiving direction, a drive module sends drive signals along the at least one first channel in the first direction simultaneously, and a receiving module can receive signals along the at least one second channel in the second direction simultaneously, and it takes T1 for the sampling. When data in the first direction is detected, the second direction is a signal driving direction, and the first direction is a signal receiving direction, a drive module sends drive signals along the at least one second channel in the second direction simultaneously, and a receiving module can receive signals along the at least one first channel in the first direction simultaneously, and it takes T1 for the sampling. Thus it takes 2*T1 for the sampling in total.

However, in the mutual-capacitance detection mode, detection data in the first direction is acquired by transmitting a drive signal along each second channel of the above at least one second channel respectively; and detection data in the second direction is acquired by transmitting a drive signal along each first channel of the above at least one first channel respectively.

It can be found that although the high speed mutual-capacitance detection mode is similar to a self-capacitance detection mode to some extent, a channel of a drive signal and a channel of a detection signal are substantially different channels because some channels send signals while some other channels receive the signals in the detection mode. Therefore, in the embodiment of the present disclosure, this detection mode is defined as a high speed mutual-capacitance detection mode. From the perspective of detection characteristics, the high speed mutual-capacitance detection mode belongs to a single-finger touch detection mode.

It needs to be noted that although both the self-capacitance detection mode and the high speed mutual-capacitance detection mode are the same in terms of detection time consumption, a signal-to-noise ratio of the high speed mutual-capacitance detection mode according to the embodiment of the present disclosure is greater than that of the self-capacitance detection mode.

Optionally, the detection period in the embodiment of the present disclosure may be configured by a user. It should be understood that the embodiment of the present disclosure does not limit the specific form of the detection period. For example, the detection period may be further pre-configured.

It should also be understood that the detection period in the embodiment of the present disclosure may be controllable.

Figure 3:
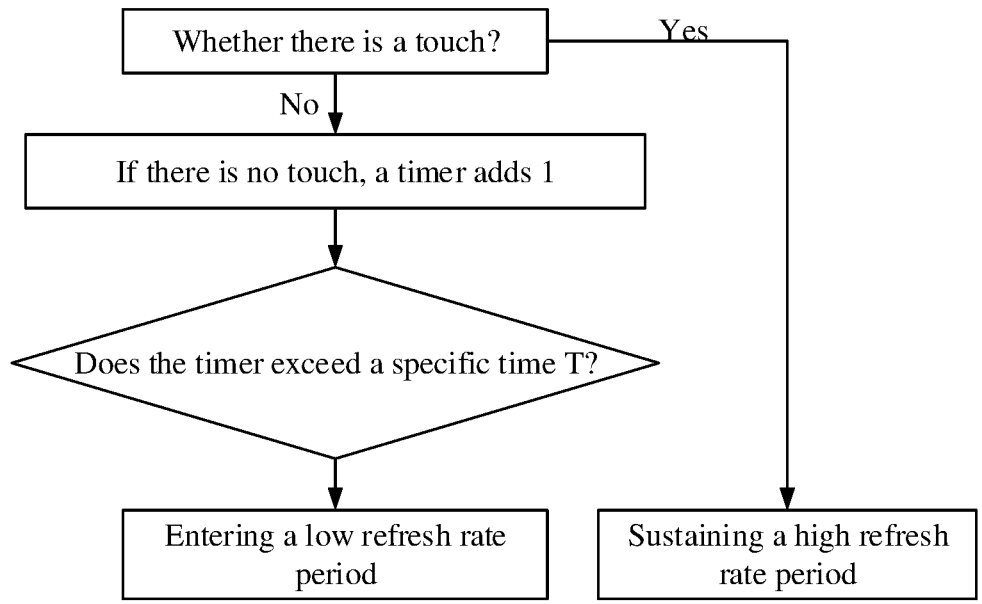
FIG. 3 is a schematic flowchart of controlling a detection period according to an embodiment of the present disclosure.

Specifically, as shown in FIG. 3, if there is no touch, a timer increases a duration of the detection period; and after exceeding a certain time T, the detection period is constant, that is, a touch screen enters a low refresh rate period. Accordingly, if it is found that a touch occurs on a touch screen, the detection period will be switched to a high refresh rate period to achieve a high speed response.

For example, when there is a touch, a refresh rate period of 100 Hz is used, i.e., one related detection is performed every 10 ms. However, when there is no touch, a refresh rate period of 25 Hz is used, i.e., a touch detection is performed every 40 ms. As such, power consumption in the absence of a touch decreases by four times in contrast with that in the presence of a touch.

Accordingly, in different refresh rate periods, user experience is also different for requirements of power consumption and response speed. For example, when a user is reading or watching a movie, low power consumption and high response would appear to be of significant importance. For another example, when a user is playing a game, response speed would influence user experience effect greatly.

A method of detecting a touch point the embodiment of the present disclosure, dynamically selecting a touch detection mode at an initial time of a current detection period by combining a touch detection result corresponding to a previous detection period, thereby detecting a touch point on a touch screen, could achieve a balance between power consumption and response speed effectively and accordingly improve user experience. In particular, in the case where there is only one touch point or no touch point on a touch screen, the method saves the proportion of detection time effectively and achieve an aim of reducing power consumption, while producing no impact on response speed of a user operation. That is, the method may use a relatively higher refresh rate, but also reduces proportion of detection time in the refresh period, thus integrating two factors of response speed and power consumption.

Optionally, if the first result is that there is no touch point or one touch point, the touch detection mode is determined as a single-finger touch detection mode.

Specifically, when the touch screen is in a low refresh rate period, it is highly likely that there is no touch point or only one touch point on the touch screen either in the current detection period, because the last detection result is still that there is no touch or one touch point. Therefore, using the single-finger touch detection mode to detect a touch point directly can avoid excessive power consumption. Even if multiple touch points are detected on the touch screen in the single-finger touch detection mode, the touch point may also be re-detected in the multi-finger touch detection mode to increase detection precision.

For example, if only one touch point or no touch point is detected on the touch screen in the single-finger touch detection mode, a touch detection result corresponding to the single-finger touch detection mode is used as a touch detection result corresponding to the detection period.

For another example, if multiple touch points are detected on the touch screen in the single-finger touch detection mode, the touch point on the touch screen is detected in the multi-finger touch detection mode. A touch detection result corresponding to the multi-finger touch detection mode is used as a touch detection result corresponding to the detection period.

Optionally, if the first result is that there are multiple touch points, the touch detection mode is determined as a multi-finger touch detection mode. The touch point on the touch screen in the detection period is determined according to detection data corresponding to the multi-finger touch detection mode.

Specifically, when the touch screen is in a high refresh rate period, it is highly likely that there are also multiple touch points on a touch screen in the current detection period because the previous detection result is still that there are multiple touch points. Therefore, using the multi-finger touch detection mode to detect a touch point directly can avoid excessive power consumption and increase detection precision.

That is, in the low refresh rate, the method of detecting the touch point according to the embodiment of the present disclosure uses a single-finger touch detection mode with shorter time consumption, and then performs a classification processing according to a detection result. Specifically, if no touch point is detected, the processing is terminated to wait for a next detection period; if one touch is detected, coordinates are calculated; if multiple touch points are detected, a multi-finger touch detection mode is activated. Thus the method achieves a balance between time consumption and response speed effectively.

Description is made below to an implementation of determining a detection mode according to the first result in the embodiment of the present disclosure with reference to drawings.

Figure 4:
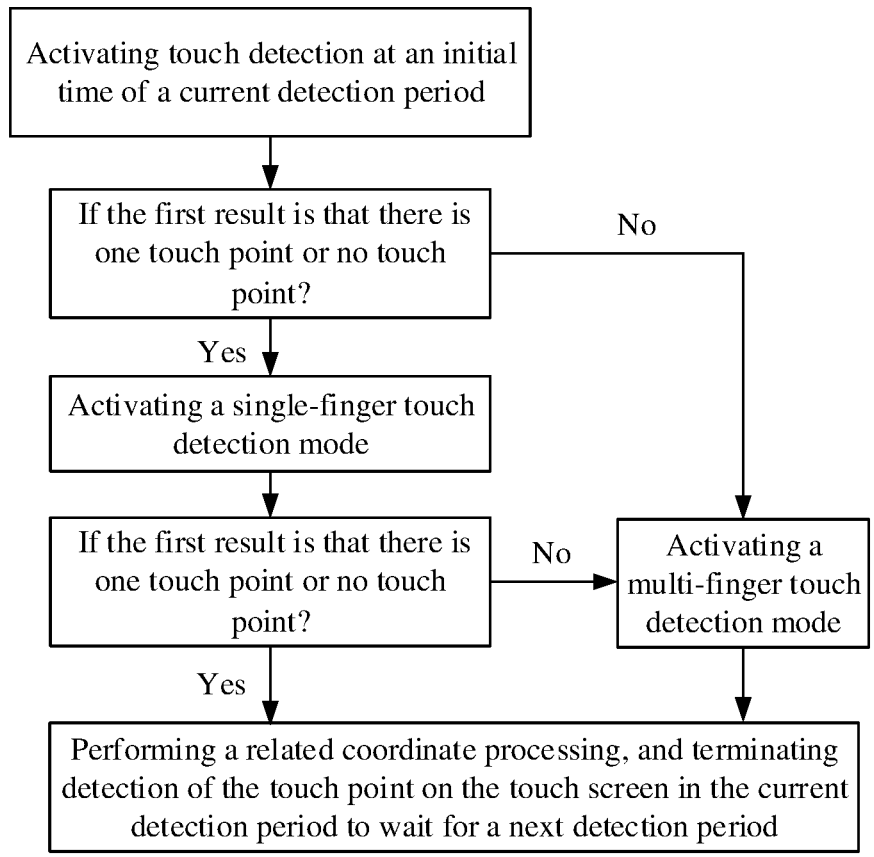
FIG. 4 is a second schematic flowchart of a method of detecting a touch point according to an embodiment of the present disclosure.

FIG. 4 is a schematic flowchart of determining a detection mode according to the first result in an embodiment of the present disclosure.

As shown in FIG. 4, if the first result is that there is one touch point or no touch point, at an initial time of a current detection period, a single-finger touch detection mode is activated, and a classification processing is performed according to the detection result. Specifically, if no touch point is detected on the touch screen, detection of the touch point on the touch screen is terminated in the current detection period to wait for a next detection period. If only one touch point is detected on the touch screen, coordinates of the touch point are obtained according to detection data, then detection of the touch point on the touch screen is terminated in the current detection period to wait for a next detection period. If multiple touch points are detected on the touch screen, a multi-finger touch detection mode is activated immediately, then coordinates of the touch points are determined by detection data in the multi-finger touch detection mode, and detection of the touch point on the touch screen is terminated in the current detection period to wait for a next detection period.

Description is made below to a specific implementation of detecting a touch point if a touch detection mode is determined as a single-finger touch detection mode according to a first detection result with reference to FIGS. 5 and 6.

Figure 5:
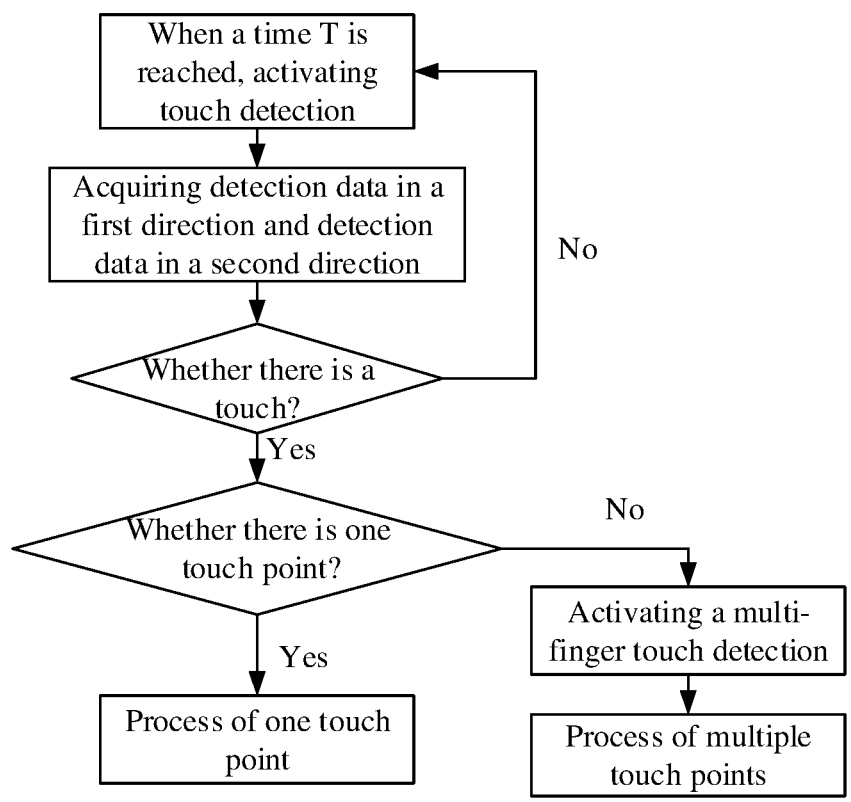
FIG. 5 is a third schematic flowchart of a method of detecting a touch point according to an embodiment of the present disclosure.

FIG. 5 is a schematic flowchart of a method of detecting a touch point according to an embodiment of the present disclosure.

As shown in FIG. 5, detection data in a first direction and detection data in a second direction are acquired in a single-finger touch detection mode at an initial time of a detection period. It is determined whether there is a touch on a touch screen according to the detection data in the first direction and the detection data in the second direction. If there is no touch, detection of the touch point is terminated in the current detection period; and if there is a touch, it is further determined whether there is only one touch point. Specifically, if there is only one touch point, coordinates of the touch point are determined according to the detection data in the first direction and the detection data in the second direction; and if there are multiple touch points, a multi-finger touch detection mode is activated immediately, then coordinates of the touch points are determined by detection data in the multi-finger touch detection mode.

In the flow as shown in FIG. 5, when a touch point is detected in a single-finger touch detection mode, detection data in a first direction and detection data in a second direction need to be acquired. However, as for a case where there is no touch point, determination can be made only by detection data in one direction.

Therefore, the single-finger touch detection mode may be further divided into two steps, thereby further reducing power consumption in a case where there is no touch point on a touch screen.

Figure 6:
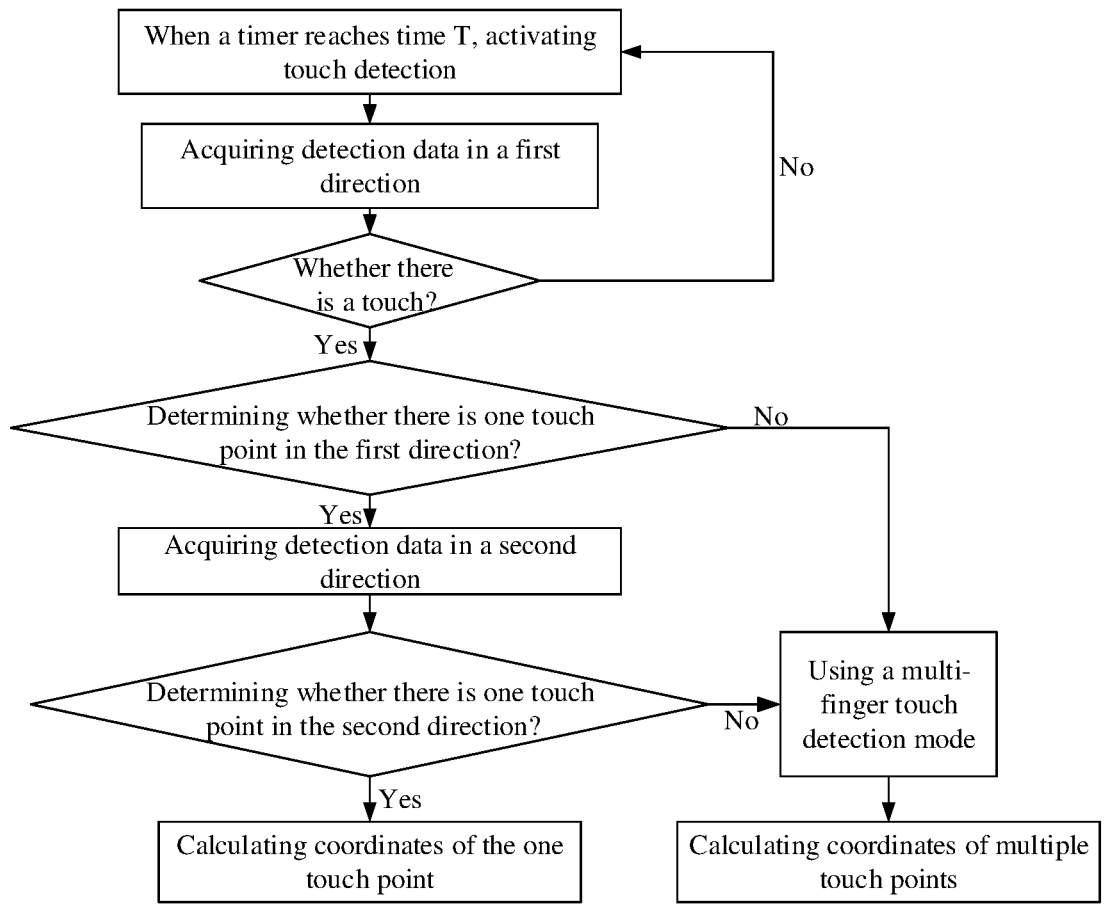
FIG. 6 is a fourth schematic flowchart of a method of detecting a touch point according to an embodiment of the present disclosure.

Specifically, as shown in FIG. 6, detection data in a first direction is acquired in a single-finger touch detection mode. It is determined whether there is a touch on a touch screen according to the detection data in the first direction. If there is no touch, detection of the touch point is terminated in the current detection period; and if there is a touch, detection data in a second direction is further acquired, and it is determined whether there is only one touch point according to the detection data in the first direction and the detection data in the second direction. If there is only one touch point, coordinates of the touch point are determined according to the detection data in the first direction and the detection data in the second direction; and if there are multiple touch points, a multi-finger touch detection mode is activated immediately, then coordinates of the touch points are determined by detection data in the multi-finger touch detection mode.

For example, when detection is performed by using a self-capacitance detection mode or a high speed mutual-capacitance detection mode, only one dimension (the first direction or the second direction) is detected. It is determined whether there is a touch point by data in such dimension, and if there is no touch point, detection is completed and a low power consumption mode is entered immediately. If there is a touch point, it is determined whether it is one touch point; if so, detection in another direction is then performed. If it is detected that there is still one touch point, coordinate calculation is performed by using sampling data. If it is found that there are multiple touch points in any part of the above process, the touch points are re-detected immediately in a mutual-capacitance detection mode.

The method of detecting the touch point according to the embodiment of the present disclosure, in a scenario where there is no touch point, for example, the touch screen is left unused or plays a video, could effectively save detection duration of a touch point and accordingly reduce power consumption. Moreover, response to a user touch does not become slower either.

Figure 7:
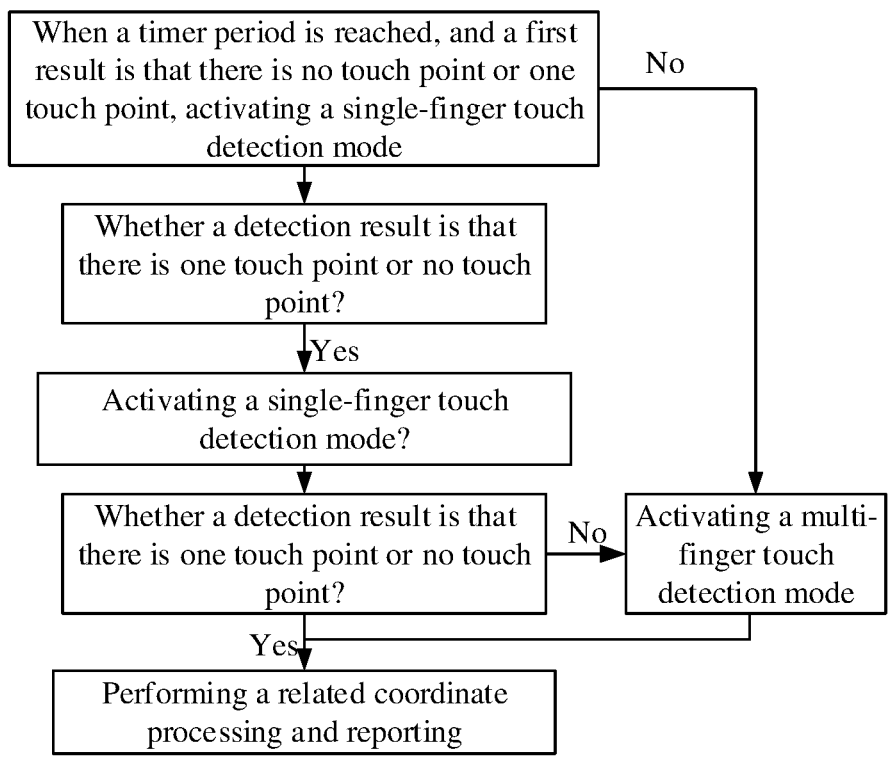
FIG. 7 is a fifth schematic flowchart of a method of detecting a touch point according to an embodiment of the present disclosure.

Optionally, as shown in FIG. 7, in an embodiment of the present disclosure, if the first result is that there is no touch point and only one touch point is detected on the touch screen in the single-finger touch detection mode, the touch point on the touch screen is re-detected in the single-finger touch detection mode. And a re-detected touch detection result is used as a touch detection result corresponding to the detection period.

Specifically, due to interference in the environment, detection is required to perform debouncing and smoothing for multiple times in a first touch scenario (a first result is that there is no touch point), so as to make a touch detection result reliable. However, this would cause response speed to become slower. And in a method of detecting the touch point in the embodiment of the present disclosure, since it takes a very short time in a single-finger touch detection mode, the single-finger touch detection mode may be adopted to start next detection immediately after completing one detection, thereby enhancing response speed of a touch in a first touch scenario effectively.

Figure 8:
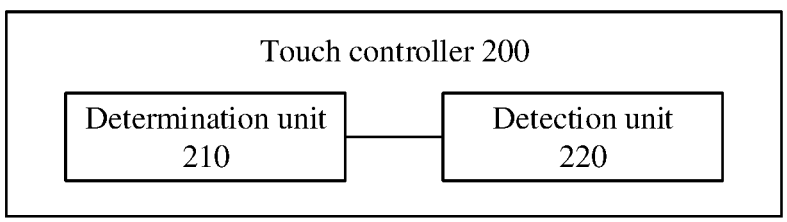
FIG. 8 is a schematic block diagram of a touch controller according to an embodiment of the present disclosure.

FIG. 8 is a schematic block diagram of a touch controller 200 according to an embodiment of the present disclosure. The touch controller 200 may execute the method 100 of detecting the touch point as shown in FIG. 1.

As shown in FIG. 8, the touch controller 200 includes:

a determination unit 210, configured to determine a touch detection mode according to a first result at an initial time of a detection period, the first result being a touch detection result corresponding to an adjacent detection period prior to the detection period; and a detection unit 220, configured to detect a touch point on a touch screen in the touch detection mode, where the touch detection mode includes a single-finger touch detection mode and a multi-finger touch detection mode.

Optionally, the single-finger touch detection mode refers to: determining a touch point on the touch screen by detection data in one direction or by combining detection data in multiple directions; and the multi-finger touch detection mode refers to: determining a touch point on the touch screen by detection data on a plane, where the detection data in each of the multiple directions includes at least one detection data for representing a touch condition in a single direction, and the detection data on the plane includes at least one detection data for representing a touch condition of planar coordinates.

Optionally, if the first result is that there is no touch point or one touch point, the determination unit 210 is specifically configured to: determine the touch detection mode as a single-finger touch detection mode.

Optionally, the detection unit 220 is specifically configured to:

use a touch detection result corresponding to the single-finger touch detection mode as a touch detection result corresponding to the detection period if only one touch point or no touch point is detected on the touch screen in the single-finger touch detection mode.

Optionally, the detection unit 220 is further configured to:

re-detect a touch point on the touch screen in the single-finger touch detection mode if the first result is that there is no touch point, and only one touch point is detected on the touch screen in the single-finger touch detection mode; and use a re-detected touch detection result as a touch detection result corresponding to the detection period.

Optionally, the detection unit 220 is further configured to:

detect a touch point on the touch screen in the multi-finger touch detection mode if multiple touch points are detected on the touch screen in the single-finger touch detection mode; and use a touch detection result corresponding to the multi-finger touch detection mode as a touch detection result corresponding to the detection period.

Optionally, if the first result is that there are multiple touch points, the determination unit 210 is specifically configured to:

determine the touch detection mode as a multi-finger touch detection mode.

Optionally, the touch screen is configured with at least one first channel in a first direction and at least one second channel in a second direction, the first direction and the second direction being perpendicular, and an intersection of the at least one first channel and the at least one second channel being a capacitance node, where the single-finger touch detection mode refers to: determining a touch point on the touch screen by detection data of the capacitance node in the first direction and/or the second direction; and the multi-finger touch detection mode refers to: determining a touch point on the touch screen by detection data of the capacitance node on a plane formed by the first direction and the second direction.

Optionally, the single-finger touch detection mode includes a high speed mutual-capacitance detection mode, and the high speed mutual-capacitance detection mode refers to:

acquiring detection data of the at least one first channel in the first direction by transmitting a drive signal simultaneously along the at least one second channel; and acquiring detection data of the at least one second channel in the second direction by transmitting a drive signal simultaneously along the at least one first channel.

Optionally, the single-finger touch detection mode includes a self-capacitance detection mode, and the multi-finger touch detection mode includes a mutual-capacitance detection mode.

Optionally, the detection period is configured by a user.

Optionally, the touch controller 200 further includes:

a multiplexer, where the touch controller 200 switches a touch detection mode of a touch sensor by controlling the multiplexer, such that the touch sensor detects a touch point on the touch screen in a switched touch detection mode.

As obviously appreciated by those skilled in the art, for the convenience and simplicity of illustration, the above-mentioned touch controller may be or may not be separated physically. A part of or all of the components may be selected to achieve the purposes of the embodiments of the present disclosure according to actual needs.

In the embodiments provided by the present application, it should be understood that the disclosed touch controller may be realized in other manners. For example, the touch controller described above is merely exemplary, e.g., the division of the units is merely a logic function division, other division manners may exist in practical implementation, for example, a plurality of units or components may be combined or integrated to another system, or some features may be omitted or not implemented.

In addition, the respective functional units in the embodiments of the present disclosure may be integrated in one processing unit, or may separately and physically exist, or two or more units are integrated in one unit.

The units described as separate components may be or may not be separated physically, and a component displayed as a unit may be or may not be a physical unit, namely, may be located in one place, or may be distributed on a plurality of network units. A part of or all of the units may be selected to achieve the purposes of the embodiments of the present disclosure according to actual needs.

Figure 9:
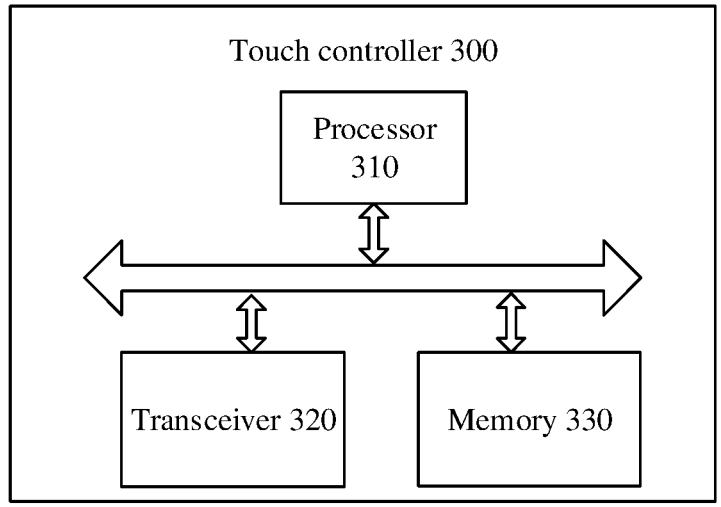
FIG. 9 is another schematic block diagram of a touch controller according to an embodiment of the present disclosure.

It shall also be noted that in the embodiment of the present disclosure, the determination unit 210 and the detection unit 220 may be implemented by a processor. As shown in FIG. 9, a touch controller 300 may include a processor 310, a transceiver 320 and a memory 330. The memory 300 may be configured to store instructions, and may also be configured to store codes and instructions executed by the processor 310. By way of example but not limitation, the processor 310, the transceiver 320 and the memory 330 implement a communication connection by means of a bus for example. It needs to be noted that a method performed by the processor is consistent with the above-mentioned method embodiment, which will not be described redundantly herein.

In addition, the detection unit of the above touch controller may include a plurality of detection unit, and similarly, the processor may also include a plurality of processors.

It should be noted that the above-mentioned method embodiment may be applied to a processor, or implemented by the processor. The processor may be an integrated circuit chip with signal processing capacity. In an implementation process, each step of the above-mentioned method embodiment may be completed by an integrated logic circuit of hardware or instructions in a software form in the processor. The above-mentioned processor may be a general purpose processor, a digital signal processor (DSP), an application specific integrated circuit (ASIC), a field programmable gate array (FPGA) or other programmable logic device, transistor logic, discrete hardware components. The various methods, steps, and logic blocks disclosed in the embodiments in the present disclosure may be implemented or performed. The general-purpose processor may be a microprocessor or the processor may be any conventional processor, etc. The steps of the method disclosed in the embodiment of the present disclosure may be directly executed and completed by a hardware decoding processor, or is executed and completed by a combination of hardware and software modules in the decoding processor. The software module may be located in a mature storage media in the art, such as a random access memory, a flash memory, a read-only memory, a programmable read-only memory or an electrically erasable programmable memory, a register. The storage medium is positioned in a memory, and a processing module is used for reading information in the memory and completing the steps included in the aforementioned methods in combination with hardware thereof.

It will be appreciated that the memory in the embodiment of the present disclosure can be either volatile memory or nonvolatile memory, or can include both volatile and nonvolatile memory. The nonvolatile memory can include read only memory (ROM), programmable ROM (PROM), erasable PROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). It should be note that the memory of the subject systems and methods described herein is intended to include, without being limited to, these and any other suitable types of memory. For example, the foregoing storage medium includes various kinds of medium that may store program codes, such as a USB disk, a magnetic disk or an optical disk, etc.

It should be understood that the touch controller in the embodiment of the present disclosure may also be implemented by means of a chip. That is, the chip only includes the touch controller 200 or the touch controller 300.

Figure 10:
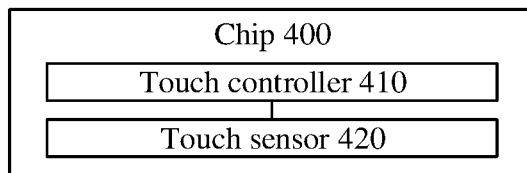
FIG. 10 is a schematic block diagram of a chip according to an embodiment of the present disclosure.

FIG. 10 is a schematic block diagram of a chip 400 according to an embodiment of the present disclosure.

As shown in FIG. 10, the chip 400 includes:

a touch controller 410 and a touch sensor 420, where the touch controller 410 detects a touch point on a touch screen by controlling the touch sensor 420.

Figure 11:
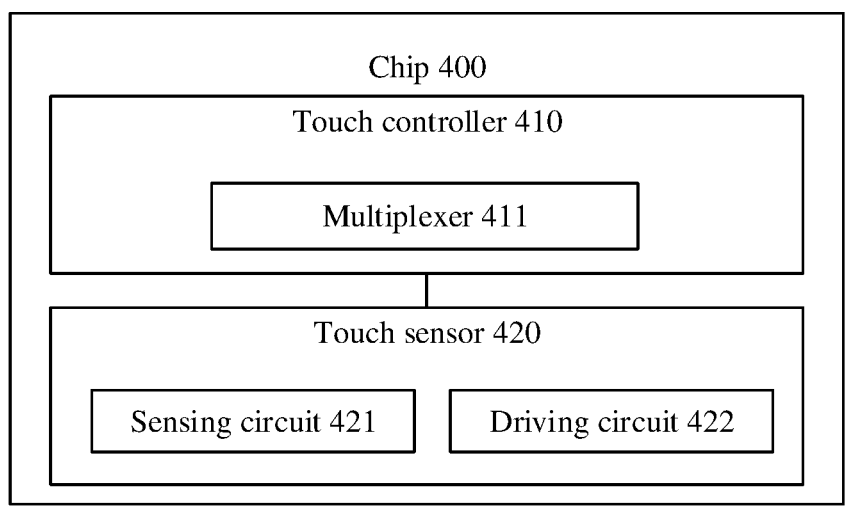
FIG. 11 is another schematic block diagram of a chip according to an embodiment of the present disclosure.

Specifically, as shown in FIG. 11, the chip 400 includes the touch controller 410 and the touch sensor 420, where the touch sensor 420 includes a sensing circuit 421 and a driving line circuit 422, and an intersecting location of the sensing circuit 421 and the driving line circuit 422 constitutes several capacitance nodes. When there is a touch, a capacitance value of a node at the corresponding location varies. By detecting variance of a capacitance in real time, the touch controller 410 may determine the corresponding touch location, calculate coordinates of a point on a touch screen at the touch location, and accordingly, generate a corresponding touch event.

Optionally, as shown in FIG. 11, the touch controller 410 includes:

a multiplexer 411, configured to switch a touch detection mode of the touch sensor 420, such that the touch sensor 420 detects a touch point on the touch screen in a switched touch detection mode.

Specifically, the multiplexer 411 may be provided inside the touch controller 410 so as to change a driving circuit into a sensing circuit, and a sensing circuit into a driving circuit.

Finally, it should be noted that the terminology used in embodiments of the present disclosure and accompanying claims is for the purpose of describing particular embodiments only and is not intended to be limiting the embodiments of the present disclosure.

For example, the singular forms "a," "an" and "the" used in embodiments of the present disclosure and accompanying claims are intended to include the plural forms as well, unless the context clearly indicates otherwise.

For another example, terms of a first component and a second component may be used in embodiments of the present disclosure, but the components shall not be limited to these terms. These terms are only used to distinguish one component from another.

For another example, depending on the context, the word "when" used herein can be interpreted into "if" or "at the time of", or "in response to determination" or "in response to detection". Similarly, depending on the context, the phrase "if determining" or "if detecting (stated condition or event)" can be interpreted into "when determining" or "in response to determination", or "when detecting (the stated condition or event)" or "in response to detection (of the stated condition or event)".

Those of ordinary skill in the art may be aware that, components of the examples described in the embodiments disclosed herein may be implemented by electronic hardware, computer software, or a combination of the two. Whether these functions are executed in hardware or software mode depends on the specific applications and design constraint conditions of the technical solution. For those of skill in the art, the described functions may be realized on each specific application by using different methods, but the realization should not be considered as gonging beyond the scope of the embodiment of the present disclosure.

If the integrated unit is implemented in the form of the software functional unit and is sold or used as an independent product, it may be stored in a computer readable storage medium. Based on such understanding, the technical solutions of the embodiments of the present disclosure substantially, or the part of the present disclosure making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the method of the embodiments of the present disclosure.

Described above are the specific embodiments of the present disclosure only, but the protection scope of the present disclosure is not limited to this, those skilled who are familiar with the art could readily think of variations or substitutions within the technical scope disclosed by the present disclosure, and these variations or substitutions shall fall within the protection scope of the present disclosure. Therefore, the protection scope of the present disclosure shall be defined by the claims.

What is claimed is:

1. A method of detecting a touch point, wherein a touch screen is configured with at least one first channel in a first direction and at least one second channel in a second direction, the first direction and the second direction being perpendicular, and an intersection of the at least one first channel and the at least one second channel being a capacitance node, wherein the method comprises:

determining a touch detection mode according to a first result at an initial time of a detection period, the first result being a touch detection result corresponding to an adjacent detection period prior to the detection period; and detecting a touch point on a touch screen in the touch detection mode, wherein the touch detection mode includes a single-finger touch detection mode and a multi-finger touch detection mode;

wherein the single-finger touch detection mode comprises a self-capacitance detection mode and a high speed mutual-capacitance detection mode, the multi-finger touch detection mode comprises a mutual-capacitance detection mode;

wherein the high speed mutual-capacitance detection mode refers to:

acquiring detection data of the at least one first channel in the first direction by transmitting a drive signal simultaneously along the at least one second channel; and acquiring detection data of the at least one second channel in the second direction by transmitting a drive signal simultaneously along the at least one first channel; and wherein when there is no touch on a touch screen, a length of the detection period is increased to reduce the refresh rate of the touch detection; and when a touch occurs on the touch screen, the length of the detection period is reduced to improve the refresh rate of the touch detection.

2. The method according to claim 1, wherein the single-finger touch detection mode refers to: determining a touch point on the touch screen by detection data in one direction or by combining detection data in multiple directions; and the multi-finger touch detection mode refers to: determining a touch point on the touch screen by detection data on a plane, wherein the detection data in each of the multiple directions comprises at least one detection data for representing a touch condition in a single direction, and the detection data on the plane comprises at least one detection data for representing a touch condition of planar coordinates.

3. The method according to claim 1, wherein if the first result is that there is no touch point or one touch point, the determining the touch detection mode according to the first result comprises:

determining the touch detection mode as a single-finger touch detection mode.

4. The method according to claim 3, wherein the method further comprises:

if only one touch point or no touch point is detected on the touch screen in the single-finger touch detection mode, using a touch detection result corresponding to the single-finger touch detection mode as a touch detection result corresponding to the detection period.

5. The method according to claim 3, wherein the method further comprises:
if the first result is that there is no touch point, and only one touch point is detected on the touch screen in the single-finger touch detection mode, re-detecting a touch point on the touch screen in the single-finger touch detection mode; and using a re-detected touch detection result as a touch detection result corresponding to the detection period.

6. The method according to claim 3, wherein the method further comprises:
if multiple touch points are detected on the touch screen in the single-finger touch detection mode, detecting a touch point on the touch screen in the multi-finger touch detection mode; and using a touch detection result corresponding to the multi-finger touch detection mode as a touch detection result corresponding to the detection period.

7. The method according to claim 3, wherein the method further comprises:
acquiring detection data in a first direction a single-finger touch detection mode;
determining whether there is a touch on a touch screen according to the detection data in the first direction;
acquiring detection data in a second direction if there is a touch;
determining whether there is only one touch point according to the detection data in the first direction and the detection data in the second direction;
determining coordinates of the touch point according to the detection data in the first direction and the detection data in the second direction if there is only one touch point;
activating a multi-finger touch detection mode if there are multiple touch points, and
determining coordinates of the touch points by detection data in the multi-finger touch detection mode.

8. The method according to claim 1, wherein if the first result is that there are multiple touch points, the determining the touch detection mode according to the first result comprises:
determining the touch detection mode as a multi-finger touch detection mode.

9. The method according to claim 1, if the first result is that there is no touch point, the touch detection mode includes a high speed mutual-capacitance detection mode.

10. The method according to claim 1, wherein the detection period is configured by a user.

11. A touch controller, wherein a touch screen is configured with at least one first channel in a first direction and at least one second channel in a second direction, the first direction and the second direction being perpendicular, and an intersection of the at least one first channel and the at least one second channel being a capacitance node, wherein the touch controller comprises:
a determination unit, configured to determine a touch detection mode according to a first result at an initial time of a detection period, the first result being a touch detection result corresponding to an adjacent detection period prior to the detection period; and
a detection unit, configured to detect a touch point on a touch screen in the touch detection mode,
wherein the touch detection mode includes a single-finger touch detection mode and a multi-finger touch detection mode;
wherein the single-finger touch detection mode comprises a self-capacitance detection mode and a high speed mutual-capacitance detection mode, the multi-finger touch detection mode comprises a mutual-capacitance detection mode;
wherein the high speed mutual-capacitance detection mode refers to:
acquiring detection data of the at least one first channel in the first direction by transmitting a drive signal simultaneously along the at least one second channel; and
acquiring detection data of the at least one second channel in the second direction by transmitting a drive signal simultaneously along the at least one first channel; and
wherein when there is no touch on a touch screen, a length of the detection period is increased to reduce the refresh rate of the touch detection; and when a touch occurs on the touch screen, the length of the detection period is reduced to improve the refresh rate of the touch detection.

12. The touch controller according to claim 11, wherein the single-finger touch detection mode refers to: determining a touch point on the touch screen by detection data in one direction or by combining detection data in multiple directions; and the multi-finger touch detection mode refers to: determining a touch point on the touch screen by detection data on a plane, wherein the detection data in each of the multiple directions comprises at least one detection data for representing a touch condition in a single direction, and the detection data on the plane comprises at least one detection data for representing a touch condition of planar coordinates.

13. The touch controller according to claim 11, wherein if the first result is that there is no touch point or one touch point, the determination unit is configured to:
determine the touch detection mode as a single-finger touch detection mode.

14. The touch controller according to claim 13, wherein the detection unit is configured to:
use a touch detection result corresponding to the single-finger touch detection mode as a touch detection result corresponding to the detection period if only one touch point or no touch point is detected on the touch screen in the single-finger touch detection mode.

15. The touch controller according to claim 13, wherein the detection unit is further configured to:
re-detect a touch point on the touch screen in the single-finger touch detection mode if the first result is that there is no touch point and only one touch point is detected on the touch screen in the single-finger touch detection mode; and use a re-detected touch detection result as a touch detection result corresponding to the detection period.

16. The touch controller according to claim 13, wherein the detection unit is further configured to:
detect a touch point on the touch screen in the multi-finger touch detection mode if multiple touch points are detected on the touch screen in the single-finger touch detection mode; and use a touch detection result corresponding to the multi-finger touch detection mode as a touch detection result corresponding to the detection period.

17. The touch controller according to claim 13, wherein the detection unit is further configured to:
wherein the method further comprises:
acquiring detection data in a first direction a single-finger touch detection mode;
determining whether there is a touch on a touch screen according to the detection data in the first direction;
acquiring detection data in a second direction if there is a touch;
determining whether there is only one touch point according to the detection data in the first direction and the detection data in the second direction;
determining coordinates of the touch point according to the detection data in the first direction and the detection data in the second direction if there is only one touch point;
activating a multi-finger touch detection mode if there are multiple touch points, and
determining coordinates of the touch points by detection data in the multi-finger touch detection mode.

18. The touch controller according to claim 11, wherein if the first result is that there are multiple touch points, the determination unit is configured to:
determine the touch detection mode as a multi-finger touch detection mode.

19. The touch controller according to claim 11, if the first result is that there is no touch point, the touch detection mode includes a high speed mutual-capacitance detection mode.

20. The touch controller according to claim 11, wherein the detection period is configured by a user.

* * * * *